Figure 1:
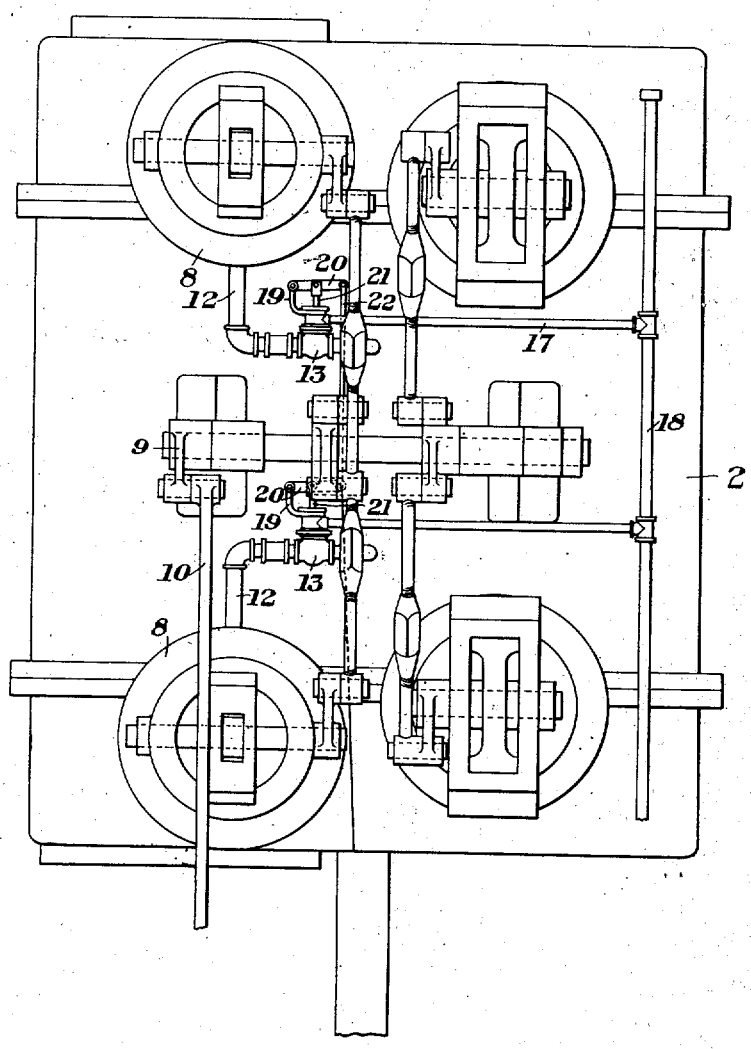

W. H. KLINE.

VALVE.

APPLICATION FILED MAY 23, 1906.

12,857.

Reissued Sept. 22, 1908.

3 SHEETS—SHEET 1.

WITNESSES.

R. A. Balderson

G. B. Blenning

INVENTOR

W. H. Kline by Baldwin & Hymes his attys

W. H. KLINE.

VALVE.

APPLICATION FILED MAY 23, 1906.

12,857. Reissued Sept. 22, 1908.

3 SHEETS—SHEET 2.

WITNESSES

R. A. Balderson

G. B. Blessing

INVENTOR

W. H. Kline by Ballenger & Baynes his atty's

W. H. KLINE.
VALVE.
APPLICATION FILED MAY 23, 1906.
12,857.
Reissued Sept. 22, 1908.
3 SHEETS—SHEET 3.
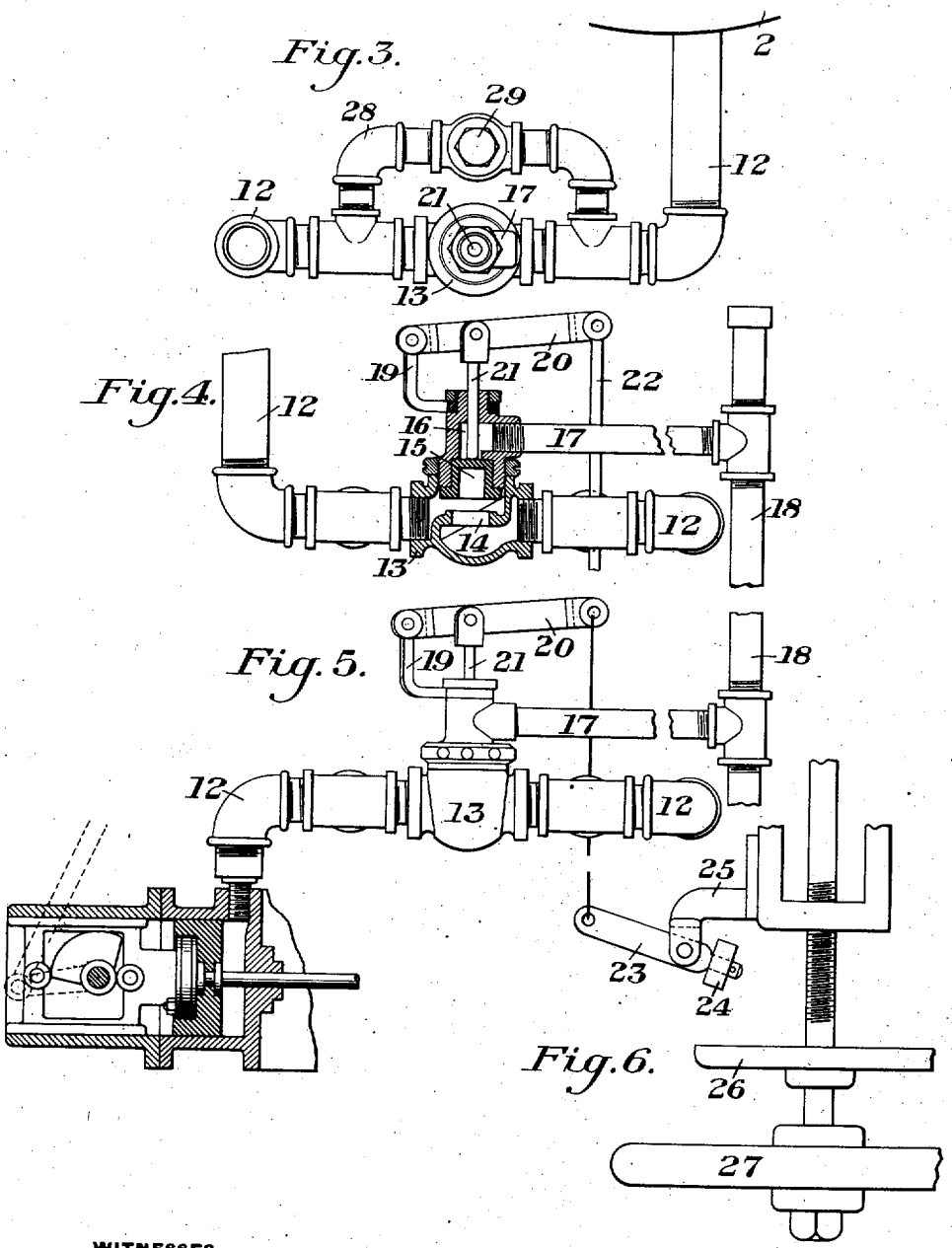
WITNESSES
R. A. Balderson
G. B. Blessing
INVENTOR
W. H. Kline
by Bakewell & Symes
his attys

UNITED STATES PATENT OFFICE.

WILLIAM H. KLINE, OF DUNBAR, PENNSYLVANIA, ASSIGNOR TO WALTER KENNEDY, OF BELLEVUE, PENNSYLVANIA.

VALVE.

No. 12,857. Specification of Reissued Letters Patent. Reissued Sept. 22, 1908.

Original No. 821,507, dated May 22, 1906, Serial No. 216,410. Application for reissue filed May 23, 1906. Serial No. 318,418.

*To all whom it may concern:*

Be it known that I, WILLIAM H. KLINE, residing at Dunbar, in the county of Fayette and State of Pennsylvania, (and whose post-office address is Dunbar, Pennsylvania,) have invented a new and useful Valve, of which the following is a full, clear, and exact description, reference being had to the accompanying drawings, forming part of this specification.

My invention relates to valves, and especially to that class of valves adapted for controlling the flow of fluid under pressure, wherein the valve is itself controlled by fluid pressure.

The object of my invention is to provide a valve especially for use in connection with blowing engines or air-compressors using the well known form of gridiron port-closure to control the flow of compressed fluid from the compressor to the storage tank, wherein the gridiron port-closure is operated by a cylinder and piston. My improved valve is designed to control the flow of a compressed fluid from the compressor to the valve actuating cylinder and piston so that the port closure will be open to admit the flow of fluid from the compressor to the tank only when the tension of the fluid in the compressor becomes equal to or greater than the tension of the stored fluid in the tank.

It is well known that in the type of compressor mainly used the port closure is operated either mechanically and positively through the medium of an eccentric or is opened by the tension of the compressed fluid in the compressor and closed positively through the medium of the eccentric. It is also well known that in compressors where the port-closure is opened by the action of the compressed fluid, the port closure piston is operated as soon as the tension of the fluid becomes sufficient to pass the usual check valve located in the pipe which conducts the fluid from the compressor to the port closure cylinder. In compressors supplied with such fluid pressure operated port-closure it is well known that the port closure is opened before the pressure becomes as great as the pressure in the storage tank. It is desirable that the port closure remain closed until the tension of the fluid in the compressor equals the tension of the fluid in the tank, so that the admitted fluid shall be of a tension similar to that already stored. My improved valve is held in a closed state by the tension of the fluid in the tank until the fluid pressure in the compressor becomes equal thereto when it is automatically opened to permit the introduction of fluid to the port closure cylinder and against the piston operating the port-closure.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 2:
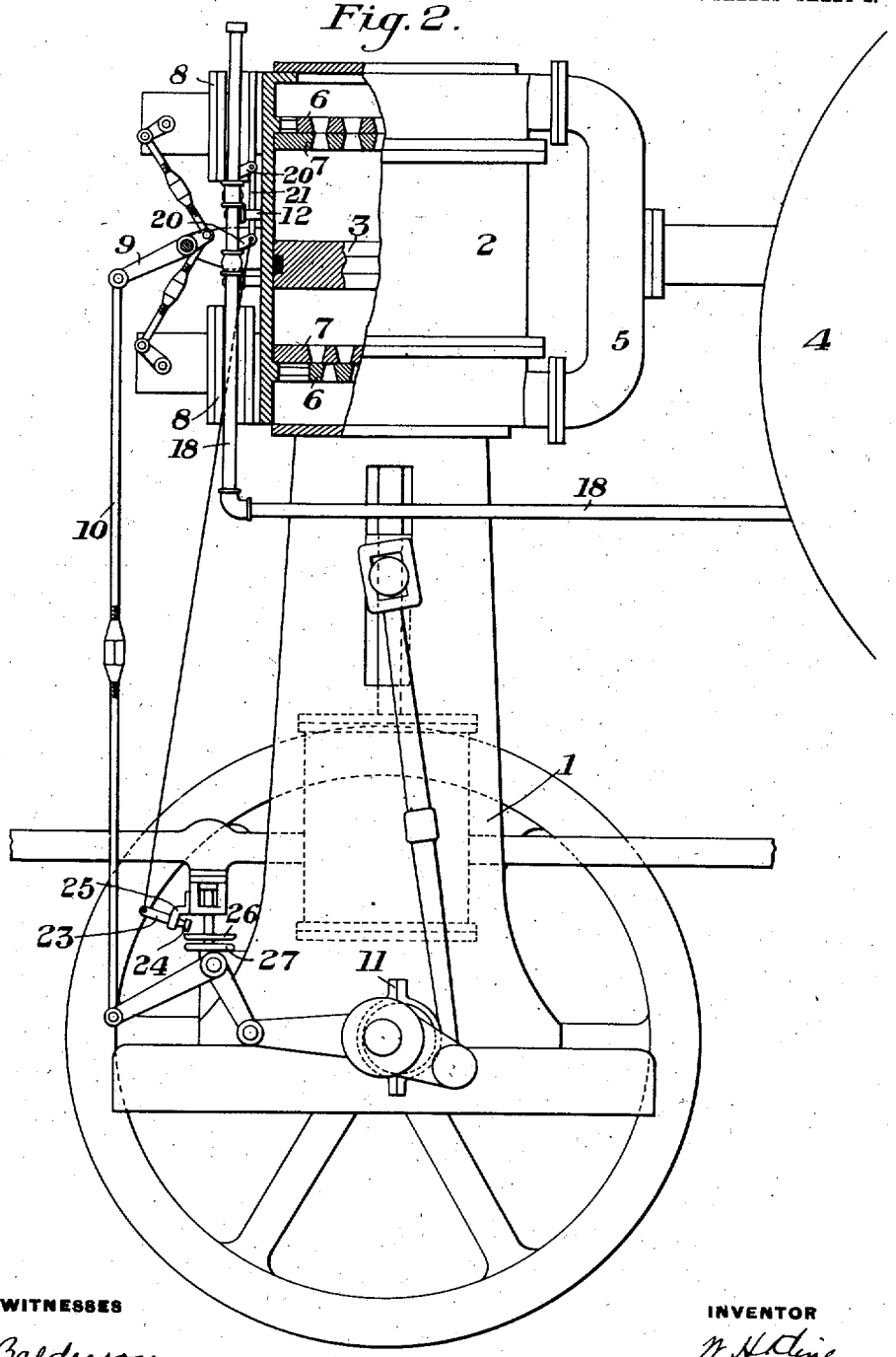

In the drawings, Figure 1 is an end elevation of a fluid pump, showing the cylinders containing pistons for operating the port-closures mounted within the pump body and my improved valve mounted thereon to control the flow of fluid from the pump to the cylinder. Fig. 2 is a side elevation partly in section, showing a compressor engine with the gridiron port-closure for controlling the flow of fluid from the pump to a storage tank and the manner of mounting and operating my improved valve. Fig. 3 is a detailed plan view; Fig. 4, a detailed section view; Fig. 5, a detailed side elevation of my improved valve, together with a vertical section of the port-closure-operating cylinder and piston. Fig. 6 is a detailed side elevation showing the connection with the throttle valve of the compressor engine and the means for holding my improved valve closed when the throttle valve of the engine is closed.

Like characters of reference designate corresponding parts throughout the various views.

My improved valve is designed for use in connection with the ordinary compressor engine 1, provided with a pump 2, within which a piston 3 is mounted to reciprocate. A tank 4 is provided in which is stored the compressed fluid supplied thereto from the pump 2 through pipes 5. Within the pump are located the usual gridiron port-closures 6, mounted to reciprocate upon and in connection with the gridiron ports 7. The port closures 6 are operated by pistons reciprocating within cylinders 8. Fluid under tension is ordinarily supplied from the pump to the cylinders for opening the port-closures 6, which are closed positively through the medium of the lever 9, connecting rod 10, and eccentric 11. A pipe 12, connecting with the pump, conducts the compressed fluid to the cylinder 8. Within this pipe 12 I locate my improved valve, consisting of a valve casing 13, provided with a valve seat 14. A valve 15 is mounted within the valve casing 13, adapted to freely reciprocate and to engage the seat 14. Above the reciprocating valve 15, the casing is provided with a chamber 16 and a pipe 17, leading into such chamber. The pipe 17 is connected with a line pipe 18, connected with and adapted to conduct fluid from the storage tank 4. Above the chamber 16 is rigidly secured to the casing an angular arm 19, upon which is pivotally mounted a lever 20. The lever 20 bears upon the upper end of a plunger 21, the lower end of which bears against the upper face of the reciprocating valve 15. My valves are preferably mounted in pairs, each adapted to admit compressed fluid to a cylinder located at opposite ends of the pump. The levers 20 are connected positively by a connecting rod 22. A lever 23 is provided with a roller 24 upon one end thereof and pivoted to any convenient stationary object, as the arm 25. The roller is so disposed as to contact with and be operated by a disk 26, rigidly secured to and rotating with the throttle valve operating hand wheel 27. The end of the lever 23 opposite the roller 24 is connected with the arm 20, so that the closing of the throttle valve will close and hold the valve 15 in such closed position. A by-pass 28 is provided for the passage of the fluid around the valve and is provided with an ordinary check valve 29, located therein.

The operation of my improved valve is as follows; The pipe 12 pierces the wall of the pump and leads to the cylinder 8. The pipe 18 leads from the storage tank 4 and into the chamber 16 above the reciprocating valve 15. The upper face of the reciprocating valve 15 is thereby subjected to a pressure from the compressed fluid in the tank 4 and held thereby normally seated. With a reciprocating movement of the piston 3 of the pump the fluid thereby becomes compressed, and the pressure acts against the lower face of the valve 15. When the tension of the compressed fluid in the pump becomes greater than the tension of the compressed fluid in the tank, the pressure upon the under side of the valve 15 unseats such valve, permitting the passage of the compressed fluid through the pipe 12 into the cylinder 8. The compressed fluid in the cylinder 8 exerts pressure upon the piston therein to slidably unseat gridiron port-closure 6 to permit the passage of the compressed fluid through the port from the pump into pipe 5 and the tank 4. It will therefore be seen that no fluid is admitted to the pipe 5 and tank 4 of a less tension than the fluid already contained in the tank. Upon the completion of the stroke of the piston 3 the port-closure 6 is positively closed through the medium of the eccentric 11, rod 10, and lever 9 in the usual manner. With the return of the piston within cylinder 8 to the position to close the port closure 6 the compressed fluid used to operate said piston is usually permitted to escape. In my improved valve the mechanical and positive return of the port-closure 6 to seat forces the fluid within said cylinder through the by-pass 28 and check valve 29.

While I have shown and described my valve in connection with a blowing engine or compressor, for which use it is primarily intended, it is evident that it could as well be used for any other purpose where it is desired to control the flow of a fluid and maintain such flow at a tension equal to the tension of a fluid from a different source. It is also obvious that minor changes in the form and construction of the valve may be made by one skilled in the art without departing from the spirit of my invention.

Having thus described my invention, what I claim as novel, and desire to secure by Letters Patent, is:

1. In a device of the character described, a storage reservoir, a fluid compresssor provided with a port to admit fluid under pressure from the compressor to the reservoir, a port-closure adapted to control the flow of fluid through the port and from the compressor to the reservoir, a piston adapted to operate said port-closure, a cylinder in which said piston is mounted to reciprocate, a pipe disposed to admit a fluid under pressure from the compressor to the cylinder to operate the piston, a valve located in said pipe, and means for admitting a fluid from the reservoir to hold the said valve normally closed, the parts being so disposed that, when the tension of the fluid in the compressor exceeds the tension of the fluid in the reservoir, the valve is opened to admit fluid to the cylinder.

2. In a device of the character described, the combination of a reservoir for the storage of compressed fluid, a fluid compressor provided with a port to admit the compressed fluid from the compressor to the reservoir, a port closure, a cylinder, provided with a piston, connected with and adapted to operate said port-closure, a pipe to conduct the compressed fluid from the compressor to the cylinder, a reciprocating valve disposed in said pipe, and a pipe connected with the reservoir and adapted to admit fluid under reservoir pressure to the upper side of the reciprocating valve to hold said valve normally seated until the fluid in the compressor assumes a greater tension than the fluid in the reservoir.

3. A device of the character described, comprising in combination a reservoir for the storage of compressed fluid, a fluid compressor provided with a port-closure adapted to control the flow of said compressed fluid from the compressor to the reservoir, a cylinder, a piston mounted within said cylinder and secured to and adapted to operate said port-closure, a pipe to conduct the compressed fluid from the compressor to the cylinder, a reciprocating valve disposed in said pipe, a pipe connected with the reservoir and adapted to admit fluid under reservoir pressure to the upper side of the reciprocating valve to hold said valve normally seated until the fluid in the compressor assumes a greater tension than the fluid in the reservoir, and a by-pass provided with a check valve adapted to permit the return passage of the compressed fluid from the cylinder around the valve.

4. A device of the character described, comprising a chamber or receptacle, a fluid compressor provided with a port, communicating with the chamber or receptacle, a port-closure adapted to control the flow of compressed fluid through the port, a cylinder, a piston mounted within said cylinder and connected with and adapted to operate the port closure, a pipe to conduct compressed fluid from the compressor to the cylinder, a reciprocating valve disposed in said pipe, a pipe connected with the chamber or receptacle and arranged to admit fluid under pressure therefrom to the upper side of the reciprocating valve to hold said valve normally seated until the fluid in the compressor assumes a greater tension than the fluid in the chamber or receptacle, means connected with the pump starting mechanism whereby the stopping of the compressor holds the reciprocating valve seated and means to permit the return flow of the fluid from the cylinder around the valve.

5. A device of the character described, comprising in combination, a cylinder, a piston within the cylinder, a storage reservoir, a compressor provided with a port to permit the flow of a compressed fluid from the compressor to the reservoir, a port-closure connected to and operated by the piston, a pipe to conduct a fluid from the compressor to the cylinder to operate the piston and open the port-closure, a reciprocating valve disposed in said pipe, means for conducting a fluid under reservoir pressure from the reservoir to hold the reciprocating valve normally closed, but adapted to be opened by the fluid in the pipe when the tension thereof becomes greater than the tension of the fluid in the reservoir, means for mechanically returning the piston and means to permit the fluid in the valve-actuating cylinder to flow back in the compression cylinder and around the reciprocating valve upon the return of the piston.

6. In a pump system, a compressor, a chamber or receptacle connected thereto, a valve controlling the flow from the compressor to the chamber or receptacle, a pressure device controlling the opening of said valve and having a connection leading to the compressor, a valve in the latter connection, and a normally open connection from another source of pressure arranged to hold the valve closed until the compressor pressure reaches a predetermined limit; substantially as described.

7. In a pump system, a compressor cylinder, outlet valves controlling the flow from the compressor cylinder, a driving motor for the compressor, and mechanical connections actuated by shutting down the driving motor and arranged to prevent opening of the outlet valve for the compressor, thereby preventing back-turning of the compressor, substantially as described.

8. In a pump system, a compressor cylinder, an outlet valve controlling the flow from the compressor to the reservoir, a driving motor for the compressor, and mechanical connection arranged to prevent opening of the outlet valve whereby reversing the movements of the compressor may be prevented when fluid is shut off from the driving motor.

9. In a pump system, a compressor cylinder, an outlet valve controlling the flow from the compressor, a pressure device controlling said valve and having a pipe leading from the compressor and a valve in said pipe, said valve having differential areas and provided with a connection from another source of pressure, whereby movement of the compressor outlet valve is prevented until the pressure in the compressor reaches a predetermined limit; substantially as described.

10. In a pump system, a compressor cylinder, an outlet valve controlling the flow from the compressor cylinder, a pressure device for actuating the outlet valve and having a pipe leading thereto from the compressor, a valve in said pipe connected to another source of pressure, and a mechanical connection arranged to prevent opening of the compressor outlet valve when desired, thereby preventing back-turning of the compressor; substantially as described.

11. In a pumping system, a compressor, a chamber or receptacle into which the compressor discharges, a valve controlling the flow from the compressor to the chamber or receptacle, a pressure device controlling the opening of said valve and having a connection leading to the compressor, a valve in the latter connection, and a normally open connection from said chamber or receptacle through which fluid pressure acts to hold the valve closed in the connection to the compressor until the compressor pressure reaches a predetermined limit, substantially as described.

12. A pump system, including a compressor, a valve controlling the flow from the compressor to the system, a pressure device controlling said valve and communicating with the compressor, a valve in said communication, and a normally open communication from the system to the valve through which fluid pressure acts to hold the valve closed in said communication to the compressor until the compressor pressure reaches a predetermined limit, substantially as described.

In testimony whereof I have hereunto set my hand this 18th day of May, 1906.

WM. H. KLINE.

Witnesses:
H. M. CORWIN,
C. P. BYRNES.